July 22, 1958  A. M. MIERS ET AL  2,844,107
SELF-ENERGIZED MULTIPLE-UNIT RAILROAD CAR TRAIN
Filed Feb. 27, 1956  6 Sheets-Sheet 1
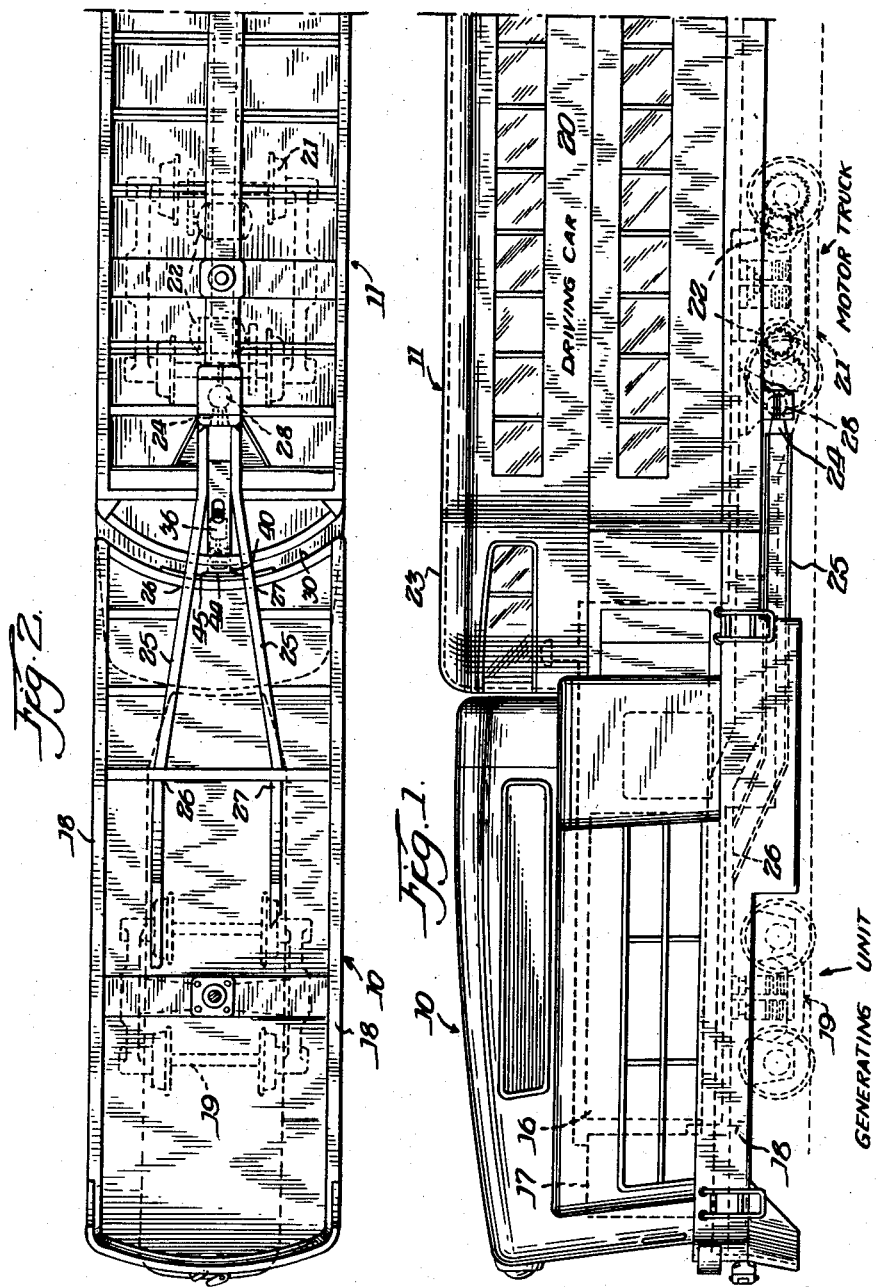
Inventors.
Archie M. Miers, &
William Van Der Sluys.
By Mann, Brown and McWilliams
Attys.

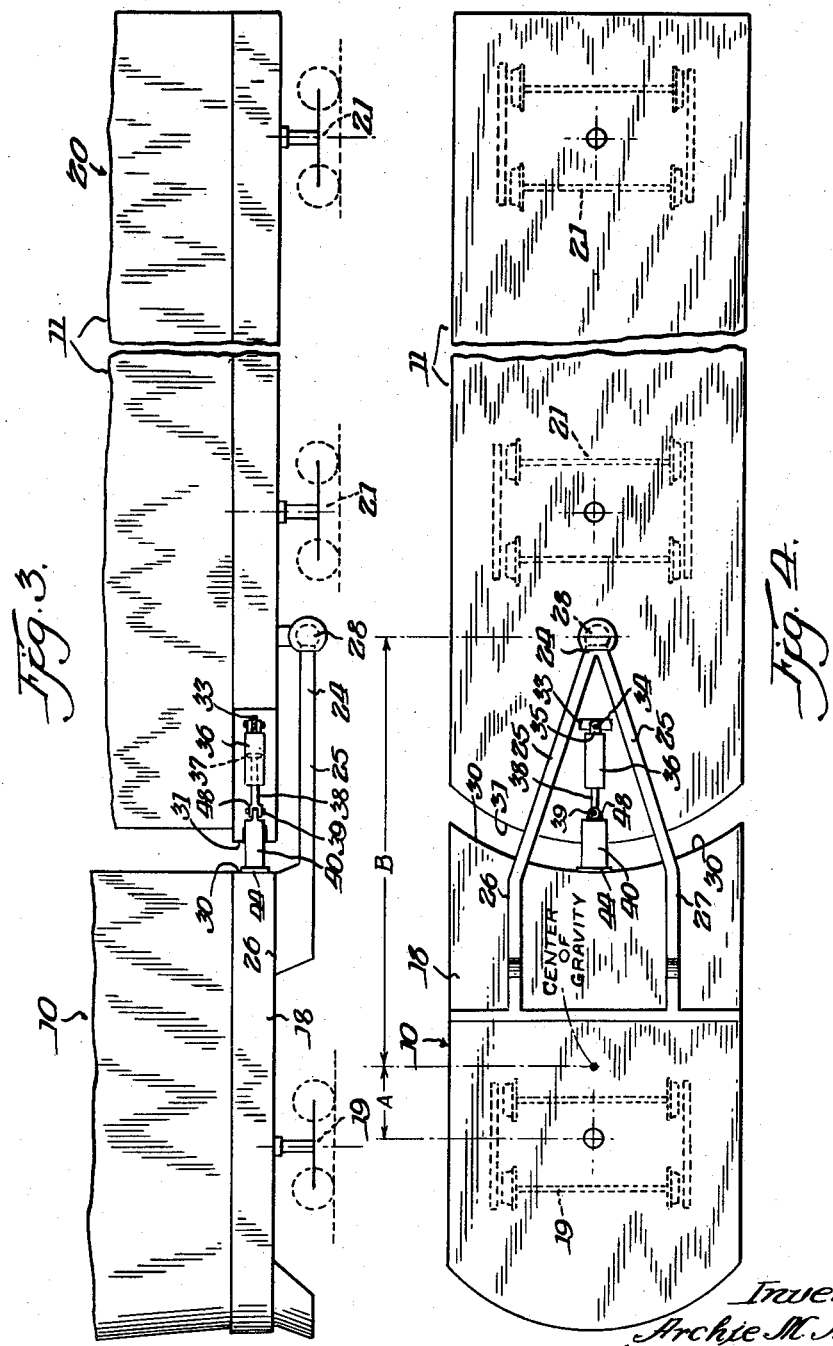

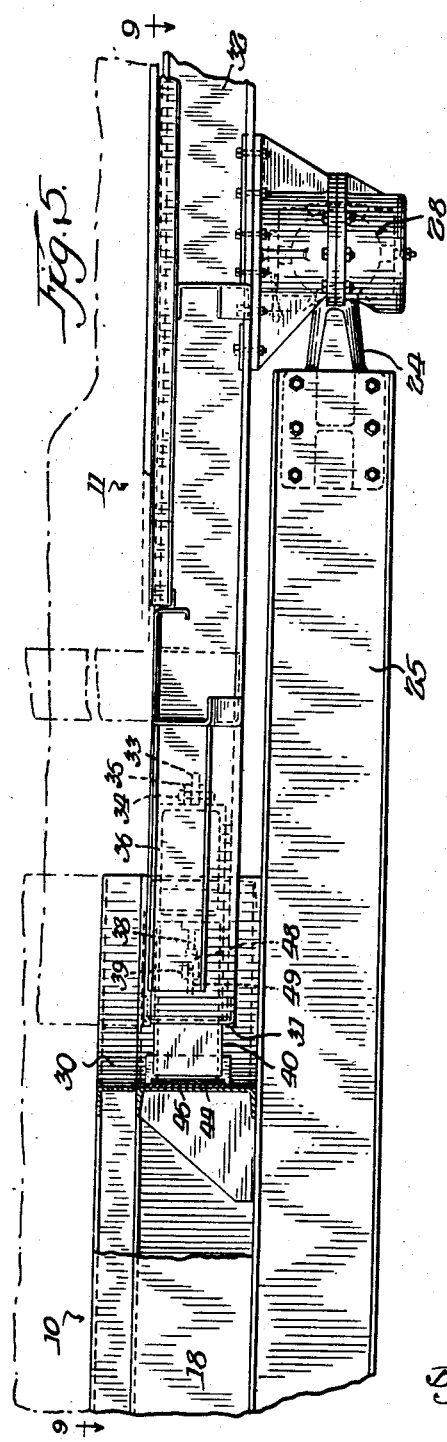
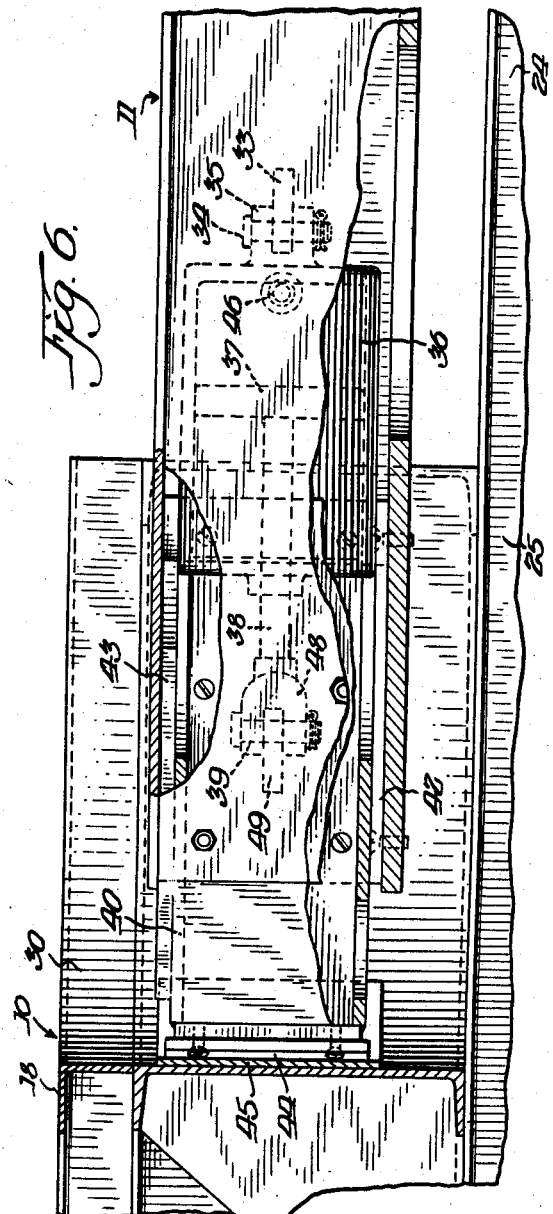

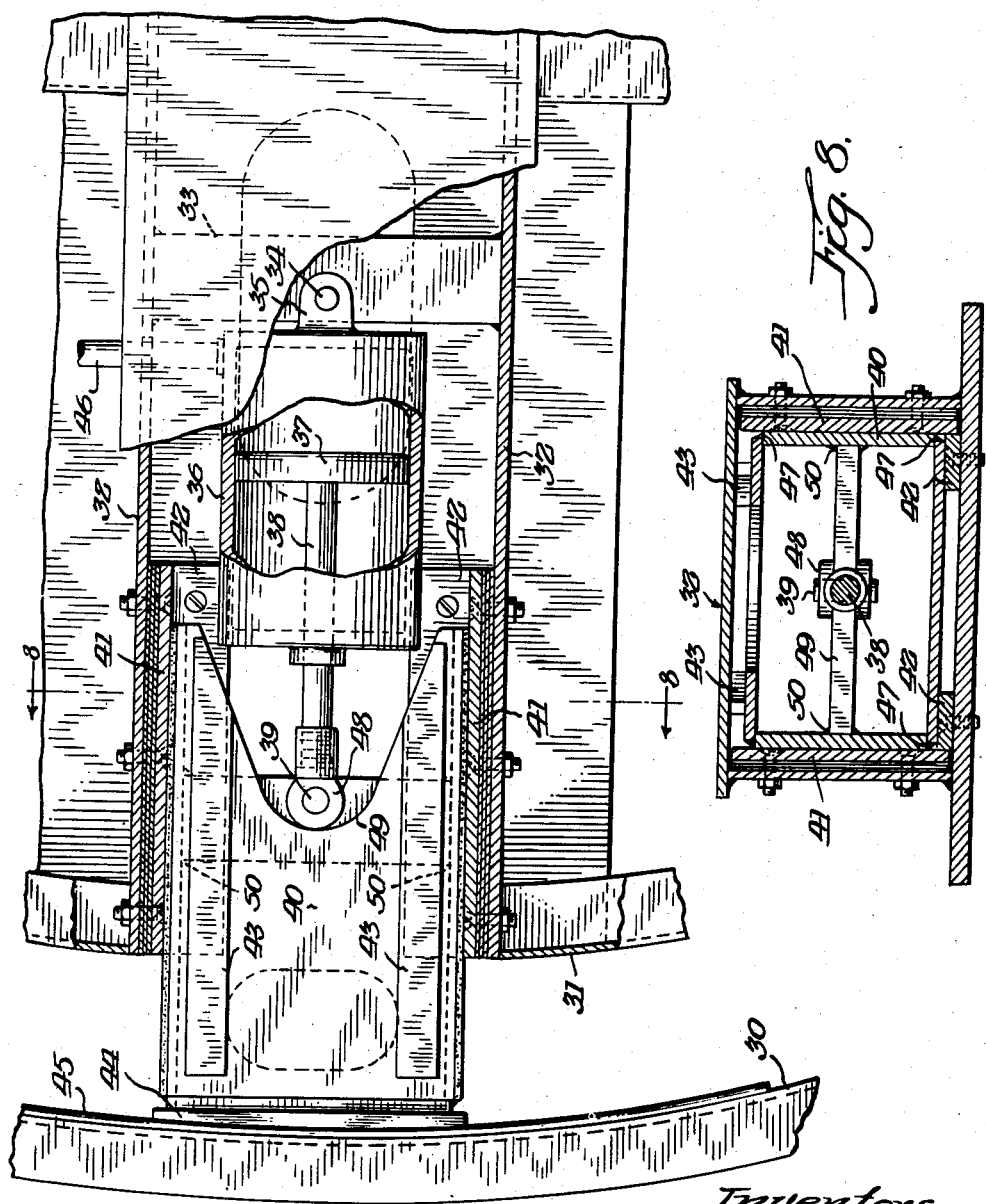

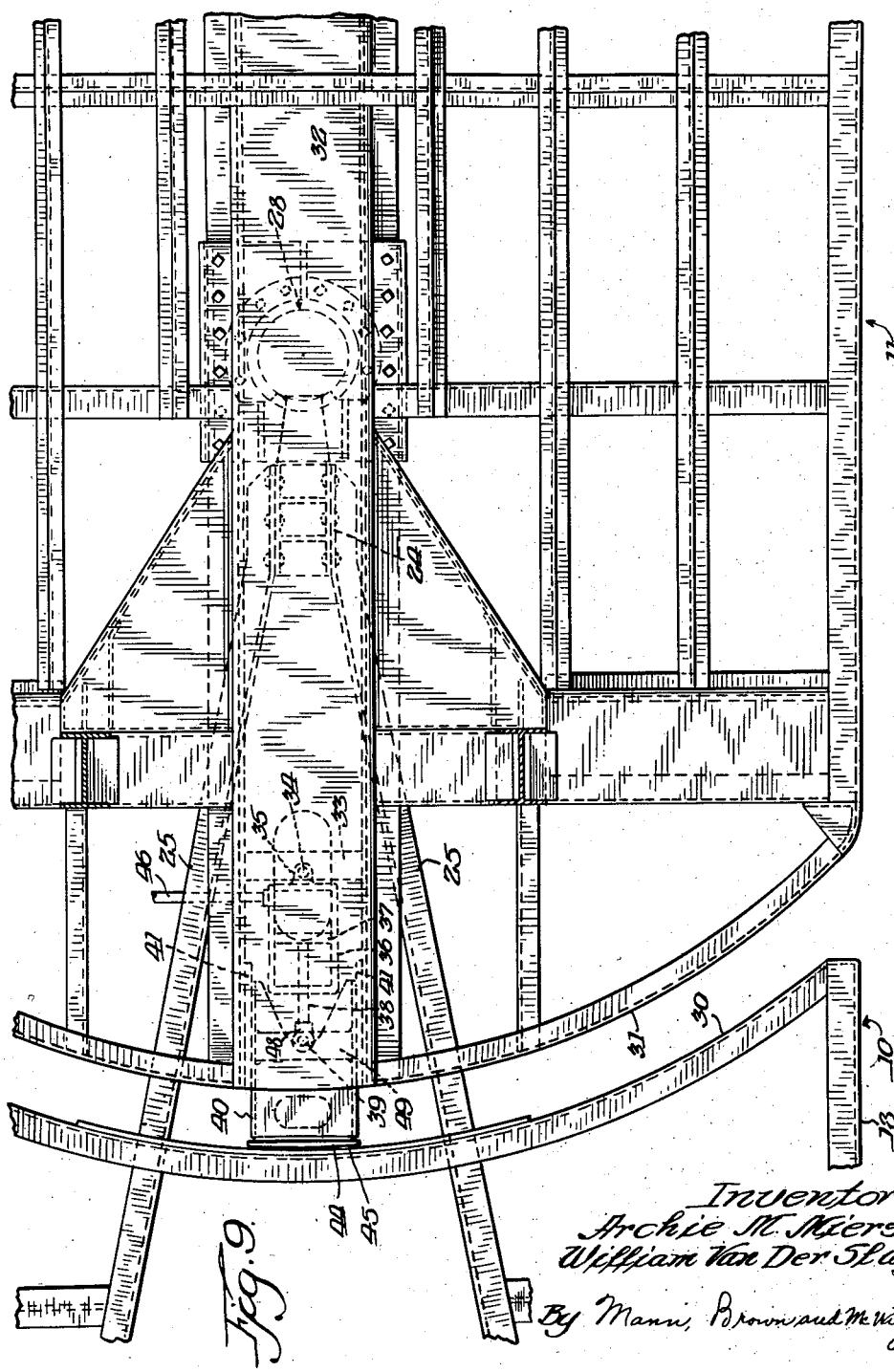

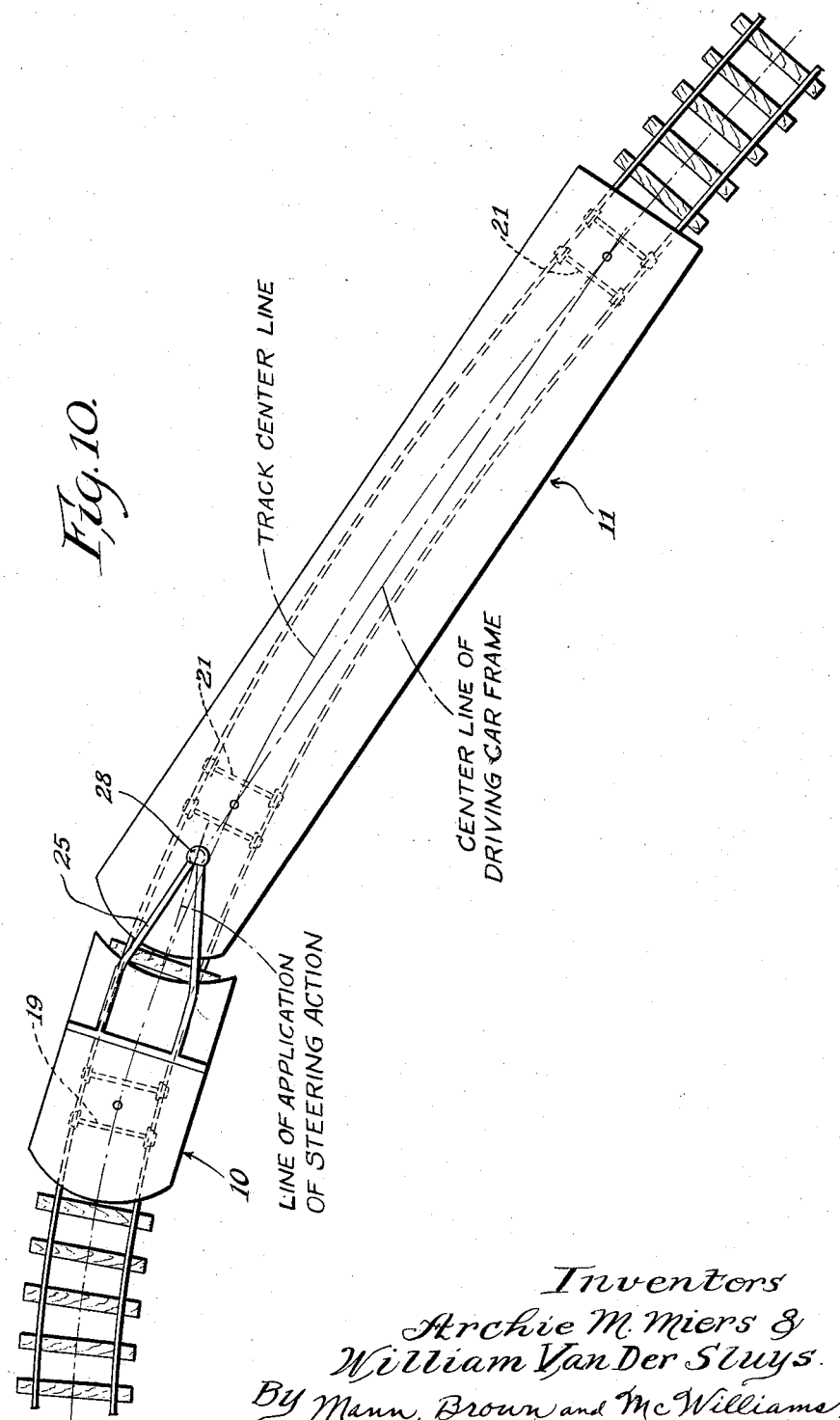

United States Patent Office 2,844,107
Patented July 22, 1958

2,844,107

SELF-ENERGIZED MULTIPLE-UNIT RAILROAD CAR TRAIN

Archie M. Miers and William Van Der Sluys, Homewood, Ill., assignors to Pullman-Standard Car Manufacturing Company, Chicago, Ill., a corporation of Delaware Application February 27, 1956, Serial No. 567,948

4 Claims. (Cl. 105—3)

This invention relates to a multiple-unit railroad car train and more particularly is concerned with trains of the self-energized type.

The principal object of the invention is to provide optimum riding qualities and passenger comfort in such a train.

Briefly this is accomplished by providing a high capacity double-decked coach car complete with traction motors and an operator or control cab that constitutes a passenger carrying driving car and that is connected to a separate power generating car that carries the power generating equipment for the train. The noise and vibration of the generating equipment is thus divorced from the passenger carrying driving car.

This general arrangement is integrated so that a single, lightweight, low cost truck in combination with a wagon tongue connection to the driving car provides adequate support for the generator car and permits the cars to be connected with their adjacent ends in overlapping relationship. The generator car together with its generating equipment and supporting facilities is also arranged so as to minimize the transmission from the generating car to the driving car of shocks and other vibrations induced in the generating car by the trackway. In addition, the wagon tongue connection to the driving car is arranged so that the driving car exerts a desirable steering action on the generating car that is maintained substantially tangential even when the train is traversing curved track.

The tendency of the cars to oscillate about a vertical axis and develop a violent lateral motion at the car ends is avoided by providing constantly resisting frictional engagement between adjacent curved surfaces carried by the cars.

The structure which provides the various operating advantages set forth is basically simple and economical to produce and this results from the novel manner in which the various elements are integrated so as to provide a maximum of effective cooperation.

Further objects and advantages of the invention will be apparent as the description is read in connection with the accompanying drawings, in which:

Fig. 1 is a side elevation of a generator unit and portion of a driving car unit equipped with means embodying the invention;

Fig. 2 is an inverted plan view of Fig. 1 with the trucks indicated in broken lines;

Fig. 3 is a diagrammatic side elevation corresponding to Fig. 1 emphasizing the connection between the two units and the stabilizing buffer;

Fig. 4 is an inverted plan view corresponding to Fig. 3;

Fig. 5 is an enlarged side elevation showing adjacent portions of the car unit frames, the connection between them, and the buffer means;

Fig. 6 is a vertical section along the center line of the car with parts broken away;

Fig. 7 is an enlarged plan view of the buffer means with parts broken away;

Fig. 8 is a vertical cross-section on the line 8—8 of Fig. 7;

Fig. 9 is a horizontal section on the line 9—9 of Fig. 5; and

Fig. 10 is a plan view illustrating the relationship between the car units when the train is passing over curved track and bringing out the effective steering action which the driving car unit applies to the generator unit.

But these diagrammatic drawings and the description are for the purpose of illustrative disclosure only, and are not intended to impose unnecessary limitations on the claims.

In the drawings, a generating unit and a driving car unit are respectively indicated generally by 10 and 11.

As best shown in Fig. 1, the generating unit includes a prime mover 16 driving an electric generator 17 both mounted on a frame 18 carried by a single wheeled truck 19 through the usual center bearing arrangement.

The driving car unit 11 in this illustrative embodiment includes a two-level and double-deck coach body 20 mounted on and carried by trucks 21 having traction motors 22 energized by current from the generating unit and delivered to the motors through suitable means chosen from those familiar to the art.

The general arrangement corresponds to that disclosed in the application of Gray et al., Ser. No. 378,562, filed September 4, 1953, now abandoned, the disclosure of which is incorporated herein by reference.

The connection between the generating unit 10 and the driving unit 11 is here shown as including a forked coupler or wagon tongue 24 having arms 25 connected to the frame 18 of the generating unit at 26 and 27, and connected to the frame of the driving car unit by ball and socket joint generally indicated at 28.

As stated in the aforesaid application, the supporting truck 19 of the generator unit is preferably non-tractive and is connected to the generator unit forwardly of the center of gravity of the unit. With this arrangement, a portion of the weight of the generator unit is transmitted to the driving car unit and this increases the adhesive effect between the track and the powered trucks of the driving car. The natural tendency of the generator unit to lean against the driving car unit also provides a more stable arrangement that offers no opportunity for developing vertical self-oscillations of the generator car.

Probably the most annoying characteristic of modern railroad cars is the tendency to oscillate about a vertical axis which gives a violent lateral motion to the ends of the cars. In the present invention, friction buffer means carried by one of the cars act upon a concentrically curved surface formed on the other car and dampen such oscillations.

As shown in Figs. 2, 4, 7, and 9, the rear end of the generating unit is concave, as indicated at 30, represented by a sill structure curved on a radius from the center of the ball joint 28. The front end of the driving car unit is convex, as indicated at 31, and is represented by a sill curved on a radius from the same center, and the two curved surfaces are spaced apart.

The framing shown somewhat in detail is deemed sufficient for car builders without specific description.

As shown in Figs. 5, 6, 7, 8, and 9, 32 indicates center sills of the driving car; 33 a cross member between the sills; 34 a pin connecting the fork 35 of an air cylinder 36 with a cross member 33. The cylinder 36 is provided with a piston 37 and a piston rod 38 pivoted at 39 to a boxlike thrust member 40 running between the center sills, where they are provided with brake lining or the like 41 and supported on runners or rails 42 and held from vertical movement by overhead strips 43.

The front of the thrust member 40 is fitted with a bronze wear shoe 44 urged against and frictionally engaging a manganese steel wear plate 45 on the sill 30.

Air pressure for operating the piston 37 is taken by a pipe 46 from the main reservoir, which has air under pressure on the order of 125 to 140 pounds per square inch.

Long travel springs of steel or rubber may be used instead of air pressure, but the latter is preferred because of its fairly constant action and also the ease with which it can be released and applied when the units are to be uncoupled or coupled.

The boxlike thrust member 40 is made of plates welded at the corners 47.

The piston rod 38 has a forked eye 48 astride a stout bar 49 welded to the thrust member at 50.

The connection between the generating unit and the driving unit has to allow universal pivotal movement and some rotation between them after the manner of torsion in order to take all the relative movements between the two units in passing over vertical and horizontal curves in the track, elevations at curves, and unavoidable movements over rail joints and crossings.

The buffer takes care of all the slack by providing strong but yielding pressure between the two units, tending at all times to separate them, whereas the connection tends at all times to hold them together.

The pressure between the shoe 44 and the wear plate 45 is approximately constant, but, of course, must yield when the connection is bent upwardly and must recover when it returns to normal or is bent downwardly.

The strong and yielding pressure between the shoe 44 and the plate 45 constantly resists the tendency to oscillate and maintains substantially stable conditions in the units.

The heavy generating unit has sufficient inertia to offer appropriate resistance to the oscillation of the driving unit through the contact between the shoe 44 and the plate 45 when urged together by the piston 37.

The interlocking adjacent curved ends of the units cooperate with the pressure between the shoe 44 and the plate 45 to effect the stabilization.

Another feature of the present invention relates to the overall arrangement of the generator car frame 18, the power generating equipment mounted thereon, and the rigid coupler. As stated previously the center of gravity of this assembly is located behind the center bearing connection point to its supporting truck 19 in order to transmit a portion of its weight to the driving car 11. However, by an appropriate arrangement of the parts of this assembly, it is possible to minimize the transmission of other undesired shocks and vibrations from the generator car to the driving car.

Briefly the assembly is arranged so that the center bearing connection point and ball and socket joint constitute conjugate centers of percussion and oscillation. Thus all forces applied to the generator car at the center bearing connection point and in a direction normal to an imaginary line extending between the conjugate centers tend to cause rotation of the generator unit about a center located at the ball and socket joint 28. Conversely forces directed normal to this imaginary line and applied through the ball and socket joint cause rotation of the generator unit about a center located at the center bearing connection point.

As is well known to those skilled in the art, in order for the center bearing connection point and ball and socket joint to constitute conjugate centers of percussion and oscillation, the following equation must be fulfilled.

$$AB = i^2$$

where $A$ is the distance between the center of gravity and the center bearing connection point (see Fig. 4), $B$ is the distance between the center of gravity and the ball and socket joint (see Fig. 4), and $i$ is the radius of gyration for the moment of inertia of the assembly.

It should be apparent that this arrangement tends to convert laterally directed shocks delivered from the trackway through the center bearing connection to the generator unit into oscillations about the ball and socket joint. Thus such shocks are not delivered to the passenger carrying driving car. The present invention is particularly advantageous since all oscillations of the generator car about a vertical axis are quickly dampened by the friction buffing means.

Since the generator unit has but one supporting truck, it requires and receives a steering effect from the driving car. This steering action is delivered to the wagon tongue 24 through the ball and socket joint 28 and is directed along the imaginary line extending between the joint 28 and the center bearing connection point. For stability, it is important that this supplemental steering action be directed substantially tangential to the track portion on which the single supporting truck 19 of the generator car is riding at any given instant. Since it is contemplated that the truck 19 may be non-tractive, the stability of the supplemental steering action assumes even more importance. According to the invention, this desirable tangential relationship is maintained even when the train is traversing curved track. As best seen in Figs. 2, 3, and 4, steering stability at all times is provided by locating the ball and socket joint 28 forwardly of the center bearing connection of the forward supporting truck 21 of the driving car.

Reference may now be had to Fig. 10 where the train is pictured traversing a curved section of track. Due to its forward location, the ball and socket joint 28 is displaced outwardly with respect ot the track centerline and the direction of application of the steering action is substantially tangent to the instantaneous direction of movement of the sole supporting truck 19 of the generator which, of course, follows the track curvature.

The damping action of the friction buffer arrangement also cooperates to improve the steering action applied to the generator car by the driving car since it causes the units to maintain their instantaneously proper alignment without oscillation when rounding curves. The ball and socket joint 28 is located, having regard to the various degrees of track curvature most frequently encountered, so as to provide the most effective steering action and the fricton buffer helps to maintain this intended alignment of the units and thus takes advantage of this preselected optimum mounting location for the ball and socket joint.

Thus the overall arrangement of parts involves a number of instantaneous interactions which contribute to a train of economical construction that exhibits optimum riding qualities.

This application is a continuation-in-part of our prior application Serial No. 392,884, filed November 18, 1953.

We claim:

1. A multiple-unit car train comprising one car unit having a frame mounted on a single truck through a center bearing connection point, an adjacent car unit having a frame supported on a plurality of trucks, and a coupler rigidly connected to the frame of said one car unit and connected to a point on the frame of said adjacent car unit for universal relative pivotal movement about said second mentioned point, the assembly comprising said frame of said one car unit and said coupler being constructed and arranged and being connected to said center bearing such that the center of gravity of said assembly is located between the connection point to said center bearing and said second mentioned point, and said points constitute conjugate centers of percussion and oscillation.

2. A multiple- unit car train comprising one car unit having a frame mounted on a single truck through a center bearing connection point, an adjacent car unit having a frame supported on a plurality of trucks, and a coupler rigidly connected to the frame of said one car unit and connected to a point on the frame of said adjacent car unit for universal relative pivotal movement about said second mentioned point, the assembly comprising said frame of said one car unit and said coupler being constructed and arranged and being connected to said center bearing such that the center of gravity of said assembly is located a first distance from the connection point to said center bearing and a second distance from the said second mentioned point and between said points such that the product of said first and second distances equals the square of the radius of gyration of the moment of inertia of said assembly.

3. A multiple-unit car train as defined in claim 1 wherein one of said car units is formed with an arcuate friction surface curved about said second mentioned point, and a resilient buffer including friction means is rigidly mounted on the other unit to act along a line passing through said second mentioned point and press said friction means against said arcuate surface.

4. A multiple-unit car train as defined in claim 3 wherein the point of connection between said coupler and said adjacent car unit is spaced forwardly a substantial distance from the point of support between the frame of said adjacent car unit and its forward supporting truck such that said adjacent car unit acts through said coupler to apply a substantially tangential steering action to said one car unit when said train passes over curved track.

References Cited in the file of this patent

UNITED STATES PATENTS

| | | |
|---|---|---|
| 535,427 | Turner | Mar. 12, 1895 |
| 553,756 | Langen | Jan. 28, 1896 |
| 747,090 | Schmidt et al. | Dec. 15, 1903 |
| 1,437,550 | Putnam | Dec. 5, 1922 |
| 1,630,930 | Fellers | May 31, 1927 |
| 1,740,358 | Latshaw | Dec. 17, 1929 |